United States Patent [19]

Yamaguchi

[11] Patent Number: 4,981,053
[45] Date of Patent: Jan. 1, 1991

[54] LINE PRESSURE CONTROL SYSTEM FOR AUTOMATIC TRANSMISSION

[75] Inventor: Hiroshi Yamaguchi, Yokohama, Japan

[73] Assignee: Nissan Motor Co., Ltd., Yokohama, Japan

[21] Appl. No.: 289,050

[22] Filed: Dec. 23, 1988

[30] Foreign Application Priority Data

Dec. 25, 1987 [JP] Japan .................... 62-327452

[51] Int. Cl.⁵ .................................... B60K 41/06
[52] U.S. Cl. ............................ 74/866; 74/867; 364/424.1
[58] Field of Search ............... 74/865–869; 364/424.1

[56] References Cited

U.S. PATENT DOCUMENTS

| | | | |
|---|---|---|---|
| 4,021,712 | 5/1977 | Ishihara et al. | 74/866 X |
| 4,653,350 | 3/1987 | Downs et al. | 74/866 X |
| 4,653,351 | 3/1987 | Downs et al. | 74/869 X |
| 4,671,139 | 6/1987 | Downs et al. | 74/866 |
| 4,674,364 | 6/1987 | Shindo et al. | 74/867 |
| 4,680,992 | 7/1987 | Hayasaki et al. | 74/869 |
| 4,685,356 | 8/1987 | Iwatsaki | 74/866 |
| 4,706,522 | 11/1987 | Nitz | 364/424.1 X |
| 4,707,789 | 11/1987 | Downs et al. | 364/424.1 |
| 4,718,310 | 1/1988 | Shindo et al. | 74/867 |
| 4,722,247 | 2/1988 | Shindo et al. | 74/866 |
| 4,811,223 | 3/1989 | Iwatsuki et al. | 74/866 X |

FOREIGN PATENT DOCUMENTS 1-199047  8/1989  Japan .

OTHER PUBLICATIONS

"Service Manual for Automatic Transmission of the RE4R01A Type" (A261C07), published in Mar. 1987 by Nissan Motor Company, Limited.

*Primary Examiner*—Dwight Diehl
*Attorney, Agent, or Firm*—Foley & Lardner, Schwartz, Jeffery, Schwaab, Mack, Blumenthal & Evans

[57] ABSTRACT

A line pressure is adjusted based on data which are updated after evaluation of an inertia phase time of a previous shifting in comparison with a predetermined value. Thus, during the next shifting of the same kind, a shifting friction device is engaged by the line pressure which has been properly adjusted, thus assuring shock-free shifting irrespectively of manufacturing variations and/or degradation with time of component parts.

3 Claims, 7 Drawing Sheets

LINE PRESSURE CONTROL SYSTEM FOR AUTOMATIC TRANSMISSION

BACKGROUND OF THE INVENTION

The present invention relates to a line pressure control system for an automatic transmission, and more particularly to a system for controlling line pressure when the automatic transmission is shifting between two gear ratios.

In the automatic transmissions, a desired gear ratio is established by hydraulically activating selected one or ones of various friction devices (such as clutches and brakes) by line pressure, and a shift between two gear ratios is effected by changing friction device or devices to be activated.

If the line pressure is excessively high, transient engagement capacity of a friction device becomes excessively high, causing great shock to occur, whereas if the line pressure is excessively low, the transient engagement capacity of the friction device becomes excessively low, causing a slip to occur, thus shortening an operating life of the friction device. Thus, the line pressure has to be appropriately controlled. Conventionally, as described in the publication entitled "SERVICE MANUAL FOR AUTOMATIC TRANSMISSION OF THE RE4R01A TYPE" (A261C07) published by in March 1987 by NISSAN MOTOR COMPANY, LIMITED, a drain circuit of a line pressure regulator valve is opened or closed by a line pressure solenoid of the duty cycle type. The duty varies from 0% to 100%. When the duty is 0%, the line pressure solenoid is left OFF, closing the drain circuit, while when the duty is 100%, the line pressure solenoid is left ON, opening the drain circuit. Thus, increasing the duty causes the line pressure regulator to increase a magnitude of a line pressure generated thereby. Various values of the duty are contained in a table data in a ROM of a microcomputer of an automatic transmission control unit. Different table data are provided, one for use at shifting operation, another for normal stable non-shifting operation, for example. The duty values are arranged in each table data as being retrievable by table look-up operation using a variable such as a throttle opening degree.

However, this conventional line pressure control system cannot cope with a situation where the line pressure solenoid has manufacturing variation or the characteristic of the line pressure solenoid degrades with time or a situation where the friction device has a manufacturing variation or the frictional materal of the friction device degrades with time. In the former situation, even if the line pressure solenoid is subject to the same duty, the magnitude of line pressure deviates from a target value. In the latter situation, even if the magnitude of line pressure is adjusted to the target value, the friction device does not show a desired performance characteristic. Thus, in any event, the conventional line pressure control system fails to avoid occurrence of substantial shift shock or reduction in operating life of the friction device.

An object of the present invention is to provide a line pressure control system for an automatic transmission wherein a magnitude of line pressure is adjusted always to such an appropriate value as to cope with the above-mentioned situations.

SUMMARY OF THE INVENTION

According to the present invention, in order to cope with manufacturing variation or degradation with time, an inertia phase time is measured in response to an input/output speed ratio of an automatic transmission, and a line pressure acting on a shifting friction device is adjusted in such a direction as to bring an inertia phase time during a shift into agreement with a predetermined value.

Specifically, there is provided a line pressure control system for an automatic transmission including a transmission input member and a transmission output member, the automatic transmission being shiftable between two gear ratios and including a friction device which is adapted to be engaged in response to a magnitude of a line pressure to effect a shifting between the two gear ratios, the line pressure control system, comprising:

input sensor means for detecting a revolution speed of the transmission input member and generating a first sensor output signal indicative of said revolution speed of the transmission input member detected;

output sensor means for detecting a revolution speed of the transmission output member and generating a second sensor output signal indicative of said revolution speed of the transmission output member detected;

means responsive to said first and second sensor output signals for determining a gear ratio of said revolution speed of the transmission input member to said revolution speed of the transmission output member;

means for measuring an inertia phase time when said gear ratio varies within a predetermined range during the shifting;

means for adjusting the magnitude of the line pressure which engages the friction device during the next occurrence of the shifting in such a manner as to decrease a difference between said inertia phase time and a predetermined value.

The present invention is based on a recognition that an inertia phase time during which a gear ratio varies becomes long when a line pressure applied to a shifting friction device is excessively high, whereas it becomes short when the line pressure is excessively low, and thus it can be evaluated whether the magnitude of the line pressure is appropriate or not based on evaluation of the inertia phase time measured.

BRIEF DESCRIPTION OF THE DRAWINGS

FIG. 5 shows a characteristic of variation of duty ratio which a line pressure solenoid is subject to;

DETAILED DESCRIPTION OF THE INVENTION

Referring to the accompanying drawings, the present invention is described.

Figure 1:
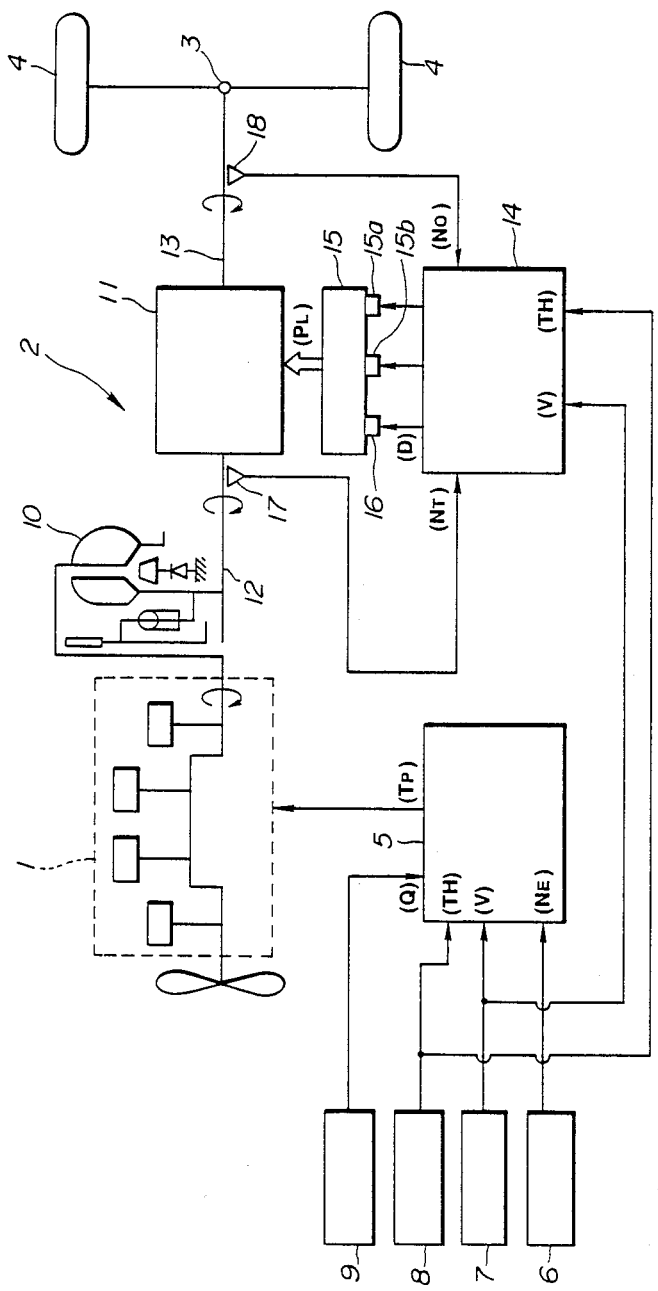
FIG. 1 a block diagram of an automative power train incorporating a line pressure control system according to the present invention.

FIG. 1 shows a power train control system incorporating a line pressure control system according to the present invention. In FIG. 1, the reference numeral 1 designates an electronic fuel injection internal combustion engine, 2 an automatic transmission, 3 a differential gear, and 4 a pair of traction wheels.

The engine 1 is provided with a microcomputer based engine control unit 5. Supplied to the control unit 5 are output signals of an engine revolution speed sensor 6 arranged to detect an engine revolution speed $N_E$, a vehicle speed sensor 7 arranged to detect a vehicle speed V, a throttle sensor 8 arranged to detect an engine throttle opening degree TH, and an intake air sensor 9 arranged to detect an amount of engine air intake Q. In the control unit 5, a width $T_p$ of a fuel injection pulse is determined based on various kinds of input information carried by these supplied sensor output signals. An ignition timing is determined also in the control unit 5. Output signals of the control unit 5 indicative of the pulse width $T_p$ and the ignition timing determined are supplied to the engine 1. Then, the engine 1 is supplied with an amount of fuel corresponding to the fuel injection pulse width $T_p$ and operates on combustion of the fuel supplied.

The automatic transmission 2 includes a torque converter 10 and a change-speed gearing mechanism 11 arranged in tandem. The engine drive is delivered to a transmission input shaft 12 via the torque converter 11. An input revolution speed of the input shaft 12 is delivered to a transmission output shaft 13. A revolution of the output shaft 13 is transmitted to the pair of traction wheels 4.

The change-speed gearing mechanism 11 involves various friction devices, such as clutches and brakes, which are selectively activated by a line pressure $P_L$ to establish a desired transmission ratio. A shift between two gear ratios is effected by changing the friction device or devices to be activated.

In order to control a gear ratio change in the change-speed gearing mechanism 11, a microcomputer based automatic transmission control unit 14, and a control valve assembly 15 are provided. The control valve assembly 15 includes a shift solenoid 15a and a shift solenoid 15b. These shift solenoids 15a and 15b are selectively energized and thus rendered ON. In response to various combinations of ON state and OFF state of these shift solenoids 15a and 15b, the line pressure $P_L$ is supplied to the various friction devices, selectively, to establish a gear ratio corresponding to an ON/OFF combination selected. The control valve assembly 15 also includes a duty solenoid 16 for controlling the line pressure $P_L$. This duty solenoid 16 is activated in accordance with a drive duty D supplied thereto and increases the magnitude of line pressure $P_L$ in response to an increase in the drive duty D. Supplied to the control unit 14 are output signals of the vehicle speed sensor 7, the throttle sensor 8, an input revolution speed sensor 17 arranged to detect a revolution speed $N_T$ of the input shaft 12, and an output revolution speed sensor 18 arranged to detect a revolution speed $N_O$ of the output shaft 13.

Figure 2:
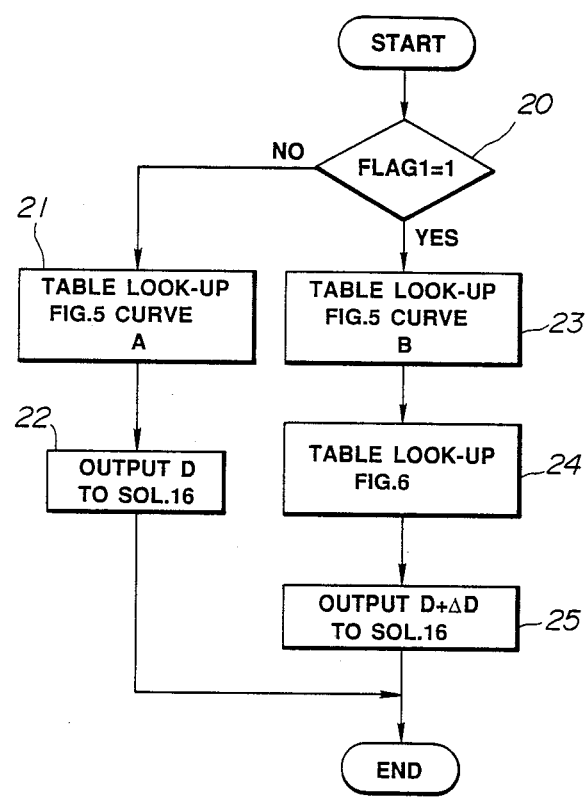
FIG. 2 to 4 are flowcharts of a line pressure control program and a shift control program.
Figure 3:
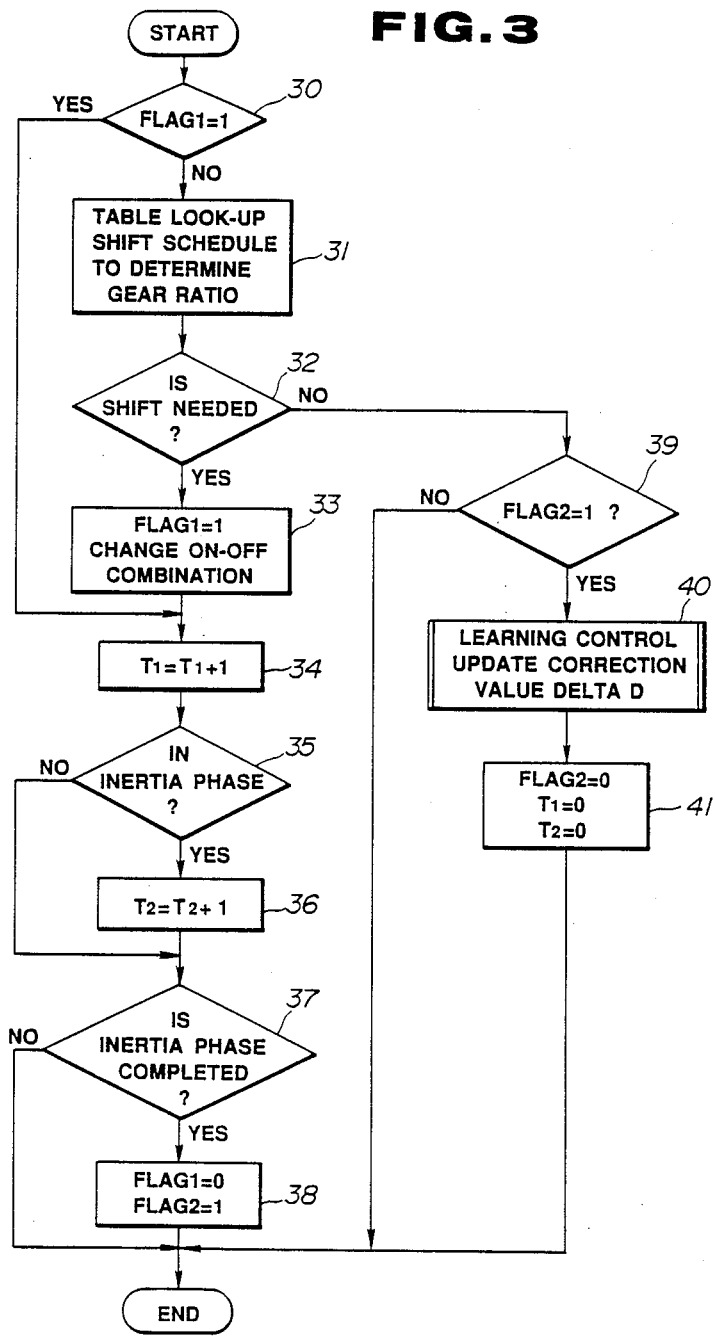
Figure 4:
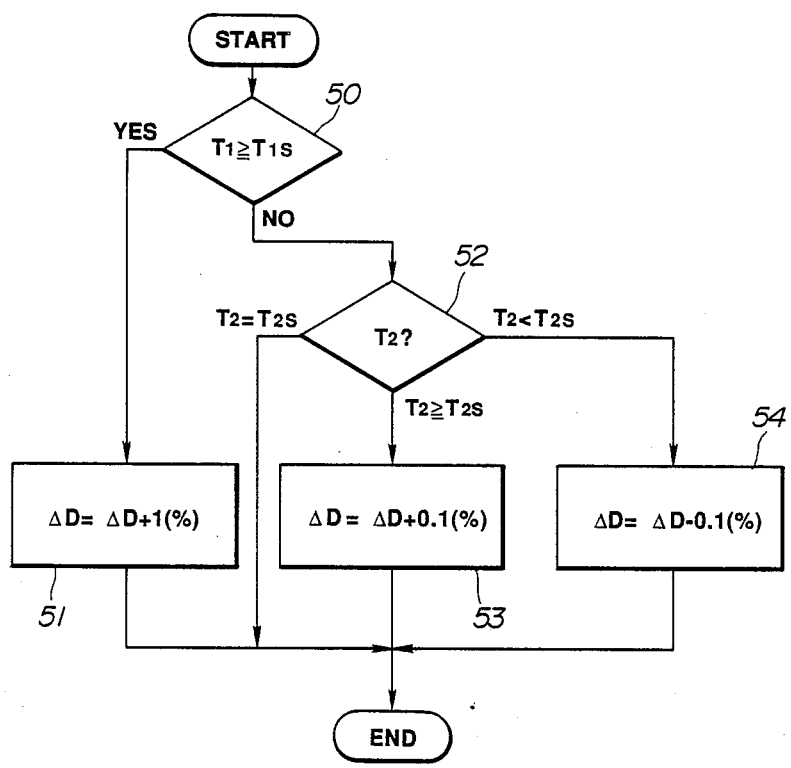

The control unit 14 includes a ROM (Read Only Memory) which stores control programs illustrated by the flowcharts shown in FIGS. 2 to 4 and effects the line pressure control and ratio change control.

The transmission 2 including the change-speed gearing mechanism 11 and the control valve assembly 15 with two shift solenoids 15a and 15b and line pressure solenoid 16 is well known and described in detail in the before mentioned publication entitled "SERVICE MANUAL FOR AUTOMATIC TRANSMISSION OF THE RE4R01A TYPE" (A261C07) published in March 1987 by NISSAN MOTOR COMPANY, LIMITED. In order to fully understand how a gear ratio change is carried out by the two shift solenoids 15a and 15b and how the magnitude of line pressure is adjusted by the line pressure solenoid 16, reference should be made to U.S. Pat. No. 4,680,992, issued to Hayasaki et al. on July 21, 1987, which has been herein incorporated by reference in its entirety (see shift solenoids 42 and 44, and a line pressure solenoid 24 in FIGS. 1A, 1B and 1C).

FIG. 2 shows the line pressure control. The execution of this line pressure control is initiated by a timer interruption. In FIG. 2, at step 20, it is checked whether a flag FLAG1 is equal to 1 or not. The FLAG1 is equal to 1 when the change-speed gearing mechanism 11 is shifting, when the FLAG1 is not equal to 1 it is not shifting. Thus, when the change-speed gearing mechanism 11 is not shifting, the control proceeds from the step 20 to a step 21 where a table look-up operation is performed using a throttle opening degree TH to obtain a duty D which the line pressure solenoid 16 is subject to from a table of data for non-shifting as illustrated by a fully drawn characteristic curve A in FIG. 5, which in duty D corresponds to the throttle opening degree TH. Then, this duty D obtained at the step 21 is output to the line pressure solenoid 16. As a result, the line pressure $P_L$ is adjusted to an appropriate value for a non-shifting operation.

Figure 5:
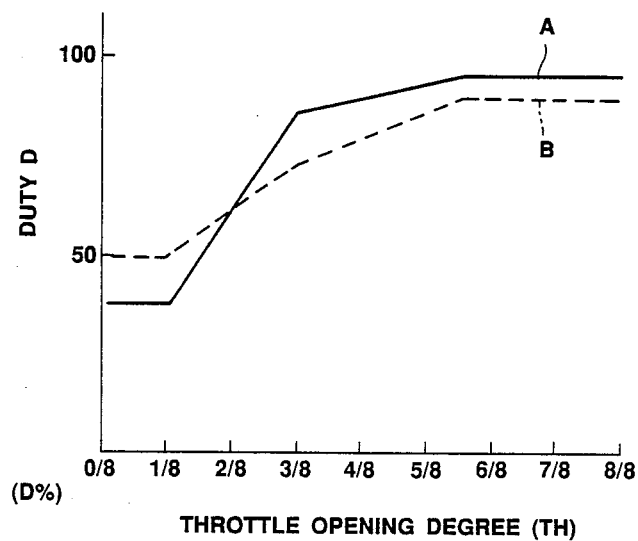
Figure 6:
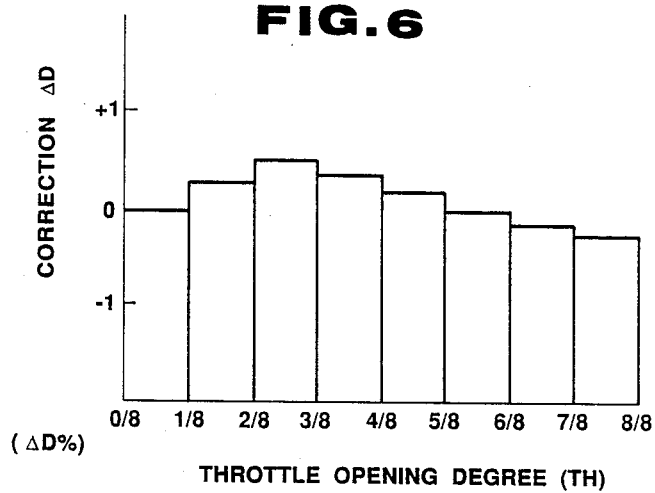
FIG. 6 is a diagram illustrating duty correction values contained in a table data stored in a RAM.

When the change-speed gearing mechanism 11 is shifting, the answer to the inquiry made at the step 20 is YES and the control proceeds to a step 23. At the step 23, there is performed a table look-up operation from a table of data as illustrated by broken line drawn curve B in FIG. 5 using the throttle opening degree TH to obtain a duty D for line pressure control, in which duty D corresponds to the throttle opening degree TH. At the subsequent step 24, a table look-up operation of a table of data shown in FIG. 5 is performed using the throttle opening degree TH to obtain a duty correction value $\Delta D$ (delta D) corresponding to the throttle opening degree TH. The table of data as illustrated in FIG. 6 is stored in a RAM (Random Access Memory) of the control unit 14 and contains various duty correction values which are updated after learning control which will be later described. Then, the control proceeds to a step 25 where a sum $D + \Delta D$ (delta D) is outputted to the line pressure solenoid 16. As a result, the line pressure $P_L$ is adjusted to the appropriate value for a shifting operation.

FIG. 3 shows a control program for effecting a ratio change control and a line pressure solenoid duty correction value control. The execution of this control program is initiated by a time interruption. In FIG. 3, at a step 30, it is checked whether the flag FLAG1 is equal to 1 or not. If the change-speed gearing mechanism 11 is not shifting and thus the flag FLAG1 is not equal to 1, the control proceeds from the step 30 to a step 31. At the step 31, using a predetermined shift schedule diagram, a desired speed ratio is determined which corresponds to vehicle speed V and throttle opening degree TH. Then, the control proceeds to a step 32 where it is judged whether a shifting is needed or not based on whether or not a current gear ratio is the same as the required gear ratio determined at the step 31. If a shift is needed and thus the answer to the inquiry at the step 32 is YES, the control proceeds from this step 32 to a step 33. At the step 33, the flag FLAG1 is set equal to 1 and an ON-OFF combination of the shift solenoids 15a and 15b is changed to establish the required gear ratio in the change-speed gearing mechanism 11. In the next and subsequent run, the steps 31, 32 and 33 are skipped as long as the flag FLAG1 continues to be equal to 1.

At the subsequent step 34, an increment is made to a timer $T_1$. Then, the control proceeds to a step 35 where it is checked whether or not an actual gear ratio $N_T/N_O$ falls in a predetermined range determined in view of a gear ratio before the shifting and a gear ratio upon completion of the shift. In this case, it is recognized that the inertia phase proceeds when the answer to the inquiry at the step 35 is YES. If the answer to the inquiry at the step 35 is YES, the control proceeds to a step 36 where an increment is made to a timer $T_2$. Upon termination of the inertia phase, the control proceeds from the step 35 to a step 37 bypassing the step 36. It will now be noted that the content of the timer $T_2$ represents a period of time when the inertia phase proceeds, viz., an inertia phase time.

At the subsequent step 37, it is checked whether the inertia phase is completed or not. This step is cooperating with the step 35 such that the answer to the inquiry at the step 37 becomes NO when the answer to the inquiry at the step 35 is YES, while the answer to the inquiry at the step 37 becomes YES when the answer to the inquiry at the step 35 is NO. Thus, when the inertia phase is completed, the control proceeds from the step 37 to a step 38 where the flag FLAG1 is reset to 0 (zero) and a flag FLAG2 is set equal to 1. This flag FLAG2 indicates whether or not a learning control which will be later described is to be executed.

In the next run after completion of the shifting, the control proceeds from the step 32 to a step 39. At the step 39, it is checked whether the flag FLAG2 is set equal to 1 or not. In this situation, since FLAG2=1, the control proceeds from the step 39 to a step 40 where the learning control program which will be described hereinbelow in connection with FIG. 4 is effected to update the duty correction data $\Delta D$ (delta D) illustrated in FIG. 6.

Figure 7:
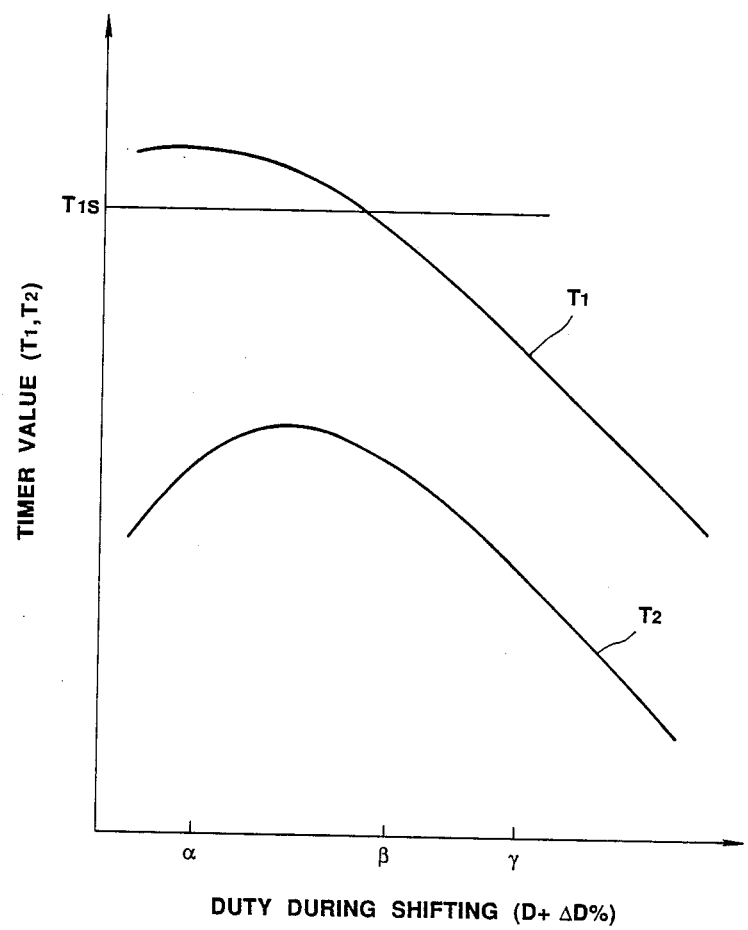
FIG. 7 shows variations of timer values versus various duty values.
Figure 8:
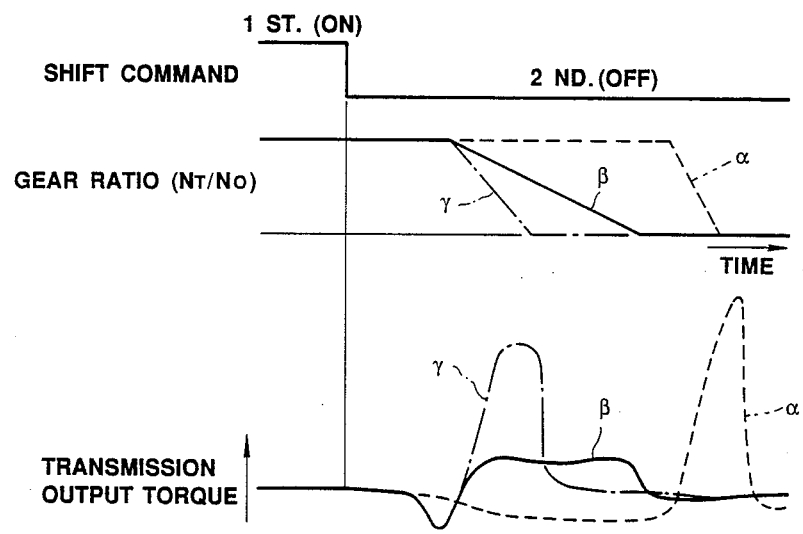
FIG. 8 are time charts illustrating operation diagrams of a shift when different duty values $\alpha$(alpha), $\beta$(beta), and $\gamma$(gamma) are used, respectively.

Referring to FIG. 4, the execution of this program is initiated. In FIG. 4, at a step 50, it is checked whether the timer $T_1$ is greater than a predetermined value $T_{1S}$. FIG. 7 shows the relationship between the content of the timer $T_1$ and the duty $D+\Delta D$ % during shifting and the relationship $T_2$ and the duty $D+\Delta D$ % during shifting, respectively. As shown in FIG. 7, when the solenoid drive duty $D+\Delta D$ % takes an excessively small value, for example $\alpha$(alpha), when the timer value $T_1$ is greater than or equal to a predetermined value $T_{1S}$, the magnitude of line pressure is very low so that a shift with substantially great shock will take place as shoWn by broken lines $\alpha$(alpha) in FIG. 8. In FIG. 8, fully drawn curves $\beta$(beta) and one-dot chain line curves $\gamma$(gamma) show two sets of operating waves illustrating shifting operations when the drive duties take values $\beta$(beta) and $\gamma$(gamma), respectively, as shown in FIG. 7. In order to prevent the occurrence of the above-mentioned shift with substantially great shock, if it is determined at the step 50 that $T_1$ is greater than or equal to the predetermined value $T_{1S}$, the control proceeds to a step 51 where the correction value $\Delta D$ (delta D) is increased by a great degree of 1%. If the correction value $\Delta D$ (delta D) is increased in this manner, the timer value $T_1$ becomes less than the predetermined value $T_{1S}$ in the subsequent run of the program.

If the timer valve $T_1$ is less than the predetermined value $T_{1S}$ the control proceeds from the step 50 to a step 52 where the inertia phase time $T_2$ is checked. If the inertia phase time $T_2$ is equal to a target value where the appropriate magnitude of line pressure is provided, the RAM data containing various correction values $\Delta D$ (delta D) shown in FIG. 6 are not modified. Thus, the current RAM data are used for the line pressure control for a shifting which is to take place next time. The target value $T_{2S}$ mentioned above differs from one kind of shifting to another and it differs depending on the degree of throttle opening even with the same kind of shifting.

However, if the inertia phase time $T_2$ is greater than the predetermined value $T_{2S}$ and thus the line pressure was relatively low to invite shortening of operating life of the friction device, the control proceeds from the step 52 to a step 53 where the correction value $\Delta D$ (delta D) in the RAM data is increased by 0.1%. Thus, the magnitude of line pressure during the next shifting will be increased in accordance with this increase since the drive duty $D+\Delta D$ will be increased.

If the inertia phase time $T_2$ is less than the predetermined value $T_{2S}$, the control proceeds from the step 52 to a step 54 since in this situation the line pressure is excessively high so that the engagement capacity of the friction device becomes excessively large to result in producing substantially large shock. At the step 54, the correction value $\Delta D$ (delta D) at the RAM data is decreased by 0.1% and used for the next shifting. Therefore, the magnitude of line pressure is decreased during the next shifting, preventing the occurrence of shift shock.

As will now be understood from the previous description, the magnitude of line pressure is kept at the most appropriate value by correcting data which the magnitude of line pressure is determined on by learning wherein the data is corrected in such a direction as to hold the inertia phase time $T_2$ at the predetermined value $T_{2S}$. Thus, a shock-free shifting without any reduction in operating life of the friction device is assured even in a situation where there are manufacturing variations and/or degradation with time of component parts.

What is claimed is:

1. A line pressure control system for an automatic transmission including a transmission input member and a transmission output member, the automatic transmission being shiftable between a first gear ratio and a second gear ratio and including a friction device which is adapted to be engaged in response to a magnitude of a line pressure to effect a shifting between the first and second gear ratios, the line pressure control system, comprising:

input sensor means for detecting a revolution speed of the transmission input member and generating a first sensor output signal indicative of said revolution speed of the transmission input member detected;

output sensor means for detecting a revolution speed of the transmission output member and generating a second sensor output signal indicative of said revolution speed of the transmission output member detected;

a control unit including:

means for repeatedly checking whether or not the automatic transmission effects shifting and incrementing a first timer when the automatic transmission effects the shifting and incrementing a first timer when the automatic transmission effects the shifting, whereby the content of said first timer is indicative of a total time elapsed from the beginning of the shifting to the completion of shifting;

means responsive to said first and second sensor output signals for determining an actual gear ratio of said revolution speed of the transmission input member to said revolution speed of the transmission output member;

means for setting a predetermined range determined in view of the first and second gear ratios, means for repeatedly checking whether or not said actual gear ratio determined falls in said predetermined range and incrementing a second timer when said actual gear ratio falls in said predetermined range during the shifting;

determining whether or not the content of said first timer is less than a first predetermined value after the completion of the shifting, and means for comparing the content of said second timer with a second predetermined value after the completion of the shifting when it is determined that the content of said first timer is less than said first predetermined value, said second predetermined value being less than said first predetermined value; and means for adjusting the magnitude of the line pressure which engages the friction device during the next occurrence of the shifting in response to result from comparing said content of said second timer with said second predetermined value after completion of the shifting.

2. A line pressure control system as claimed in claim 1, wherein said adjusting means includes a line pressure solenoid, and said control unit contains first data, and second correction data, means for controlling a drive signal supplied to said line pressure solenoid in response to a sum of said first data and said second correction data, and means for modifying said second correction data in response to said result from comparing said content of said timer with said predetermined value.

3. A method of controlling a line pressure for an automatic transmission including a transmission input member and a transmission output member, the automatic transmission being shiftable between a first gear ratio and a second gear ratio and including a friction device which is adapted to be engaged in response to a magnitude of a line pressure to effect a shifting between the first and second gear ratios, the method comprising the steps of:

detecting a revolution speed of the transmission input member and generating a first sensor output signal indicative of said revolution speed of the transmission input member detected;

detecting a revolution speed of the transmission output member and generating a second sensor output signal indicative of said revolution speed of the transmission output member detected;

repeatedly checking whether or not the automatic transmission effects the shifting and incrementing a first timer when the automatic transmission effects the shifting, whereby the content of said first timer is indicative of a total time elapsed from the beginning of the shifting to the completion of the shifting;

determining responsive to said first and second sensor output signals an actual gear ratio of said revolution speed of the transmission input member to said revolution speed of the transmission output member;

setting a predetermined range determined in view of the first and second gear ratios;

repeatedly checking whether or not said actual gear ratio determined falls in said predetermined range and incrementing a second timer when said actual gear ratio falls in said predetermined range;

determining whether or not the content of said first timer is less than a first predetermined value after the completion of the shifting;

comparing content of said second timer with a second predetermined value after the completion of the shifting when it is determined that the content of said first timer is less than said first predetermined value, said second predetermined value being less than said first predetermined value; and adjusting the magnitude of the line pressure which engages the friction device during the next occurrence of the shifting in response to a result from comparing said content of said second timer with said second predetermined value.

* * * * *